(12) United States Patent
Shimano et al.

(10) Patent No.: US 8,023,390 B2
(45) Date of Patent: Sep. 20, 2011

(54) OPTICAL HEAD AND OPTICAL DISK DEVICE

(75) Inventors: Takeshi Shimano, Yokohama (JP); Harukazu Miyamoto, Higashimurayama (JP); Hideharu Mikami, Kawasaki (JP); Jiro Hashizume, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 381 days.

(21) Appl. No.: 12/025,797

(22) Filed: Feb. 5, 2008

(65) Prior Publication Data

US 2008/0205246 A1 Aug. 28, 2008

(30) Foreign Application Priority Data

| Feb. 23, 2007 | (JP) | ................................. 2007-043124 |
| May 16, 2007 | (JP) | ................................. 2007-130002 |
| Sep. 27, 2007 | (JP) | ................................. 2007-250375 |

(51) Int. Cl.
*G11B 7/135* (2006.01)
(52) U.S. Cl. ............................. 369/112.16; 369/112.29
(58) Field of Classification Search ............ 369/112.16, 369/112.29, 112.21, 112.28; *G11B 7/135*
See application file for complete search history.

(56) References Cited

U.S. PATENT DOCUMENTS

| 4,837,759 | A | * | 6/1989 | Miyazaki et al. | .......... | 369/30.15 |
| 5,218,586 | A | * | 6/1993 | Tadokoro | ................... | 369/44.14 |
| 5,488,592 | A | * | 1/1996 | Kim | ............................ | 369/13.29 |
| 2009/0316539 | A1 | * | 12/2009 | Mikami et al. | ............. | 369/44.32 |
| 2010/0039917 | A1 | * | 2/2010 | Ide | ................................ | 369/100 |

FOREIGN PATENT DOCUMENTS

| JP | 05-342678 | * 12/1993 |
| JP | 06-223433 | 8/1994 |

* cited by examiner

*Primary Examiner* — Aristotelis Psitos
(74) *Attorney, Agent, or Firm* — Antonelli, Terry, Stout & Kraus, LLP.

(57) ABSTRACT

An interference type optical head and an optical disk device that can easily adjust an optical path length difference of a couple of lights, ensure higher signal amplification effect, and are suitable for reduction in size are provided in order to improve a regeneration signal quality with amplification of signal in the case where reflectivity of each layer must be lowered and relative noise for the signal increases because read speed is high in a multilayer optical disk. In view of essentially improving an S/N ratio of the regeneration signal in high-speed rotation of a multilayer disk, a plurality of interference phases are generated and an optical system for differential calculation has been reduced in size with an angular selective polarization conversion element in the optical disk device for amplifying the signal with interference of the light not radiated to the disk with the reflected light from the disk. Moreover, adjustment of reflection mirror angle of the reference light is no longer required by using a corner cube prism as the reference light reflection mirror and highly accurate signal detection can also be realized with a simplified structure.

20 Claims, 15 Drawing Sheets

FIG. 7A
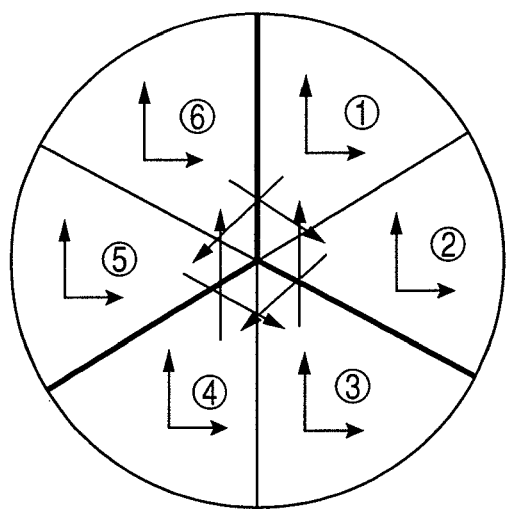
FIG. 7B
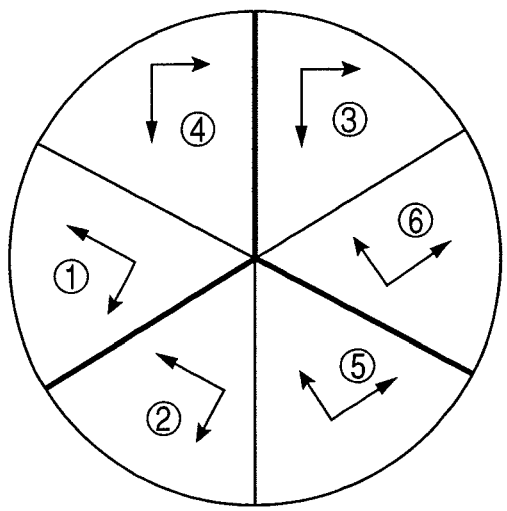
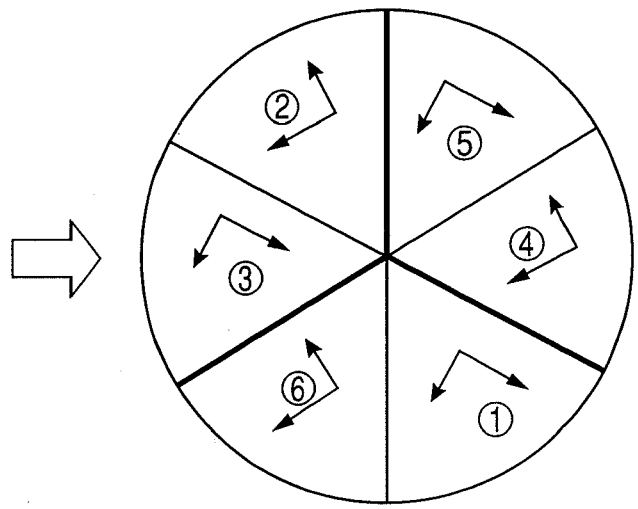
FIG. 7C

OPTICAL HEAD AND OPTICAL DISK DEVICE

CLAIM OF PRIORITY

The present application claims priority from Japanese application JP 2007-043124 filed on Feb. 23, 2007, JP 2007-130002 filed on May 16, 2007 and JP 2007-250375 filed on September 27, the contents of which are hereby incorporated by reference into this application.

FIELD OF THE INVENTION

The present invention relates to an optical head corresponding to high S/N of a regeneration signal and an optical disk device mounting the relevant optical head.

BACKGROUND OF THE INVENTION

An optical disk as an optical recording medium has almost reached the limit in its resolution of an optical system as a product of Blue-Ray system utilizing a blue-color laser diode and an objective lens corresponding to high NA and is thought to be required to introduce in near future a multilayer structure of recording layer of an optical disk. In such a multilayer optical disk, it is required to detect almost identical light power from each layer and therefore reflectivity of the irradiation light of a particular layer cannot help thinking of being lowered. However, the optical disk is further required to attain high-speed dubbing of video contents in combination with improvement in recording capacity. In addition, since high transfer rate of data is also still improved, it may be assumed, if the present situation is continued, that it will become impossible to acquire sufficient S/N ratio of the reproduction signal. Accordingly, realization of high S/N ratio of a detection signal is essentially required to simultaneously conduct realization in further improvement in multilayer structure and high-speed operation in future.

A technology for high S/N ratio of regeneration signal of an optical disk is disclosed, for example, in the patent document 1 (JP-A No. 1993-342678) and the patent document 2 (JP-A No. 1994-223433) or the like. These patent documents relate to a high S/N ratio of regeneration signal of a magneto-optical disk, aiming at increasing a light power of the light not irradiating an optical disk in order to amplify amplitude of a very weak signal, by branching the light from a laser diode before radiation to an optical disk for multiplexing with a reflected light from the optical click. In differential detection between a transmitted light and a reflected light of a polarization beam splitter that has been used in the related art for signal detection of the magneto-optical disk, detection is substantially conducted through amplification of an orthogonally polarized element with incident polarization with interference of an original incident polarization element and a polarized element orthogonally crossing the incident polarization direction generated with polarization rotation due to the magneto-optical disk. Accordingly, a signal can be amplified by increasing the original incident polarization element, but an incident light intensity of optical disk must be controlled to intensity lower than a certain predetermined level in order to prevent that data is erased or overwritten. Meanwhile, in the related art explained above, a light to be interfered with a signal light is previously separated therefrom, and this signal is interfered with the signal light without condensation to the disk in view of intensifying the light to be interfered for signal amplification without relationship with light intensity at the front surface of disk. Therefore, in the principle, the more intensified light intensity is, the more the S/N ratio can be increased in comparison with noise of an amplifier for voltage conversion of a photo-electric current from an optical detector and shot noise of the optical detector.

In the patent document 1 (JP-A No. 1993-3426778), a couple of lights are interfered with each other to detect interference intensity. In this case, an optical path length of non-reflected light of disk to be interfered is set variably, aiming at acquisition of interference signal amplitude. In the patent document 2 (JP-A No. 1994-223433), differential detection is also conducted in addition to detection of interference intensity. Therefore, high S/N ratio is obtained by cancelling intensity element of each light not making contribution to signal and also cancelling noise element of these lights. In this case, a non-polarizing beam splitter is used for differential detection.

SUMMARY OF THE INVENTION

An optical system of an interferometer used in the related arts explained above is a Mach-Zender type optical system and this system is not suitable for reduction in size of the optical system because a large number of optical components are used. In the optical system of the Mach-Zender type interferometer, a unit for dividing a light into a signal light and a reference light if different from a unit for multiplexing the signal and the reference light. Meanwhile, in an optical system of a Twyman-Green or a Michaelson type interferometer, interference is made by returning again the signal light and reference light to the unit for dividing first the light. Although a reason why the Mach-Zender type optical system is used is not explained in detail in the related arts explained above, it may be assumed that a λ/2 (half-wave) plate (λ: wavelength) that may be rotated for adjustment is required to arrange for transmitting the light only in one way, not in both ways, of the optical path for interference in order to adjust polarization direction of the lights to be interfered, because a signal light of magneto-optical disk is generated by polarization rotation. Moreover, in the related arts, it may be thought a certain difficulty lies for practical use, because a method for adjusting an optical path length difference between a couple of lights is not explained. The patent document 2 explains, in regard to this problem, that a mirror to reflect the reference light is arranged on a disk in separation from recording film. However, it means that a disk based on a new standardization is proposed and is not related to attain a high S/N ratio of the disk in the related art.

In the related arts explained above, it is required, for amplification of signal, to adjust optical path length difference between signal light and reference light up to the accuracy of a fraction of wavelength in order to attain the maximum interference intensity. In actual, however, it is extremely difficult to always adjust it in this accuracy without radiation of the reference light to a disk.

In view of addressing the problems explained above, an object of the present invention is to provide an interference type optical head and an optical disk device that can easily adjust an optical path length difference between a couple of lights, ensures high signal amplification effect and is suitable for reduction in size of an optical system.

The present invention has employed the following unit to achieve the object explained above.

According to an aspect of the present invention, an optical head is basically constituted with a light source such as a laser diode, a first dividing unit such as a polarization prism for dividing the light from this light source to a first light flux and a second light flux, a collecting unit such as an objective lens for collecting the first light flux and then radiating to an optical recording medium, a reflection mirror for reflecting the second light flux as the reference light without collection to the optical recording medium, a second dividing unit for dividing the light that has been superimposed and interfered by guiding again the signal light reflected from the optical recording medium and the reference light to the first dividing unit and for varying phase relationship of the signal light and reference light included in respective divided lights, and a plurality of detecting unit for detecting divided lights. Optical detectors as the plurality of detecting unit are characteristically formed on the same substrate. Accordingly, enlargement of optical system can be prevented, a signal can be amplified stably, and an optical system can be constituted small in size.

Moreover, the reflection mirror is replaced with a corner cube. The corner cube is an element having the property that the reflected light is essentially returned in the same direction as the incident light because of symmetrical layout of reflected light path even if the light is incident in any incident angle. It is made by cutting a cubic body in the plane perpendicular to a diagonal coupling opposite vertexes of the cubic body. An incident light is applied from the direction of the cutting plane. When the signal light and reference light interferes, if the reference light is tilted, many interference fringes are generated with such interference and interference intensity is lowered through averaging process. However, in the corner cube, since the reflected light is never tilted even when the corner cube is tilted because of the property explained above, fall of such interference intensity can be prevented. However, an optical axis must be adjusted to a vertex of the corner cube for realizing matching between optical axes of incident light and reflected light. When an incident light is applied to a vertex or an edge line, scattered lights are generated due to the influence of chamfered region and chipping. Therefore, an optical axis is usually arranged with deviation from vertex and ridge line. However, in this embodiment, scattering of light is suppressed by setting a width of vertex or ridge line as narrower as possible for a diameter of light flux for elimination of displacement of the optical axis. Accordingly, adjustment may become easier and higher effect of amplification of signal can be maintained.

According to another aspect of the present invention, the second dividing unit is a key of the small-sized structure of the optical system. This dividing unit is constituted with a third non-polarizing dividing unit, a selective polarization conversion element and a polarization splitting element formed on the same substrate not operating at least one of a couple of lights divided with the third dividing unit and converting at least another light into the circular polarization light.

According to still another aspect of the present invention, the optical system can be constituted smaller to eliminate influence of mutual displacement by not individually arranging the third dividing unit, selective polarization conversion element, and polarization splitting element, but integrally joining these elements.

Moreover, according to another aspect of the present invention, the selective polarization conversion element can be reduced in size by constituting the same element with an anisotropic optical material having an optical axis in the optical axis direction. As a method not using anisotropic optical material, for example, it is possible to give a phase difference to the polarized element at respective positions not only by varying the travelling directions of lights divided from the non-polarized light with the third dividing unit but also by separately arranging the polarization conversion elements in the optical axis direction up to the position perfectly separated in space so that the separated lights are inputted respectively at different positions to the polarization conversion element. However, in this case, the optical system becomes large in size because a certain distance is required to perfectly separate the divided lights. Accordingly, in the present invention, a uniaxial anisotropic optical material having the optical axis in the optical axis direction of incident light is used. In the case where such material is formed in the shape of a plate to constitute the polarization conversion element, the incident light vertical to the element does not generate any phase difference irrespective of the polarizing direction. However, in this case, the inclined incident light generates a phase difference determined by anisotropy of refraction index, incident angle, and thickness of element between the polarization (P-polarization) where an electric field vibrates within a plane including incident light axis and element normal and the polarization (S-polarization) where the electric field vibrates in the direction perpendicular to the same plane. Therefore, only the lights of the particular incident angles can be selectively circularly polarized, even if these lights are not spatially separated, by designing parameters to provide a phase difference of 90°. Thereby, it is no longer required to separately provide the third dividing unit for non-polarization in the optical axis direction and the polarization conversion element in view of realizing reduction in size of the optical system.

According to another aspect of the present invention, a unit is also provided to detect defocus of signal light on the optical recording medium as a signal, defocus is compensated by controlling a unit for collecting and radiating a first light flux with a focus error signal, and the corner cube can be moved in the optical axis direction in order to adjust an optical path length difference between the signal light and the reference light within interference distance (coherence length) of a light source with the focus error signal. Therefore, the objective lens is driven in the optical axis direction with focus control and even when optical path length up to the optical recording medium from the first dividing unit varies in the degree of coherence length of light source or more, signal amplifying effect can be maintained by sustaining coherence between the signal light and the reference light.

Accordingly, it is possible to provide an interference type optical head and an optical disk device that can easily adjust an optical path length difference of a couple of lights, ensures higher signal amplifying effect and is suitable for reduction in size of the optical system. Therefore, regeneration signal quality can be improved through amplification of signal in the cases where reflectivity of each layer of a multilayer optical disk must be lowered, and relative noise for signal increases because a read speed is high.

BRIEF DESCRIPTION OF THE DRAWINGS

FIG. 7A, FIG. 7B, and FIG. 7C show polarization rotations by the corner cube;

DETAILED DESCRIPTION OF THE PREFERRED EMBODIMENTS

The preferred embodiments of the present invention will be explained below with reference to the accompanying drawings.

Figure 1:
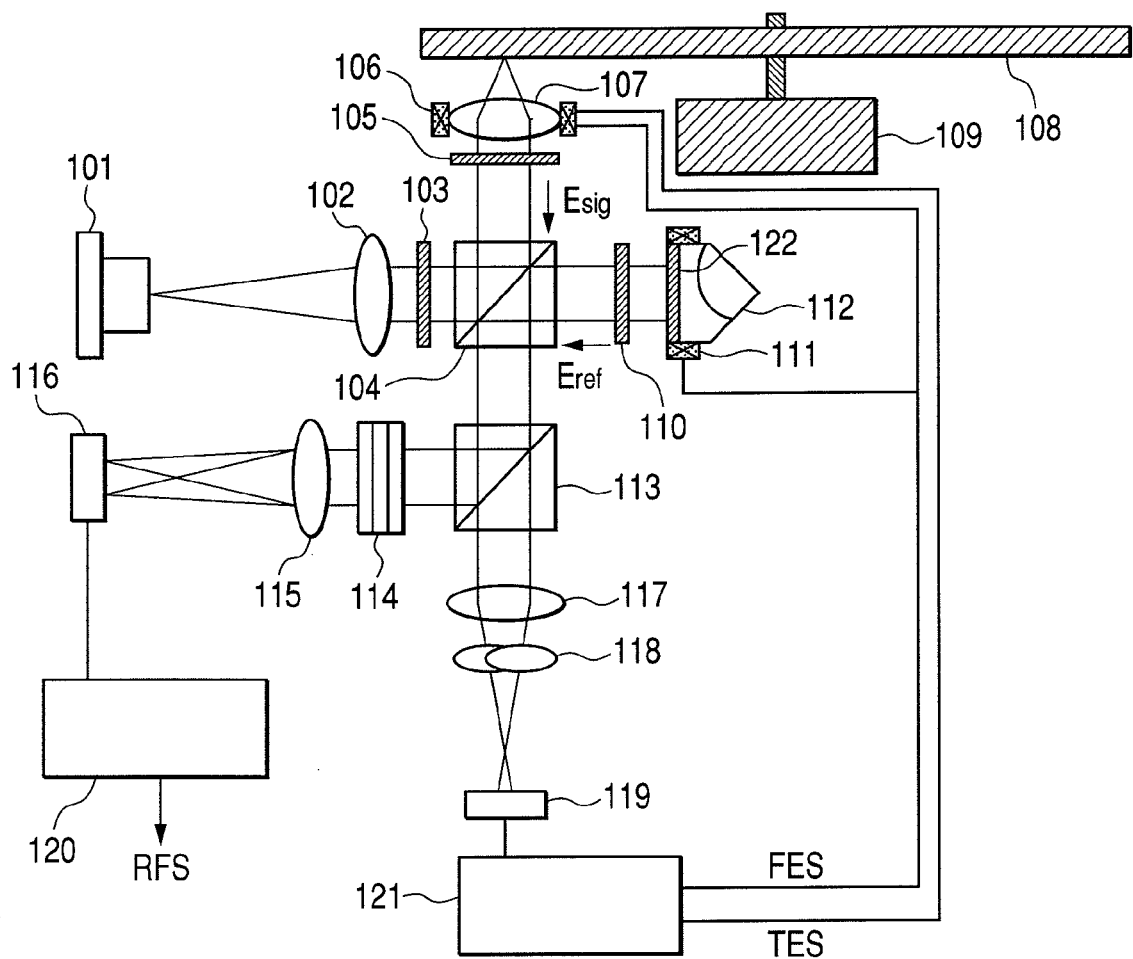
FIG. 1 shows a structure of a basic embodiment of the present invention.

FIG. 1 is a basic embodiment of the present invention. The light from a laser diode 101 is inputted, with a collimating lens, to a polarization prism 104 with transmission through a half-wave plate 103 as the collimated light. The polarization prism 104 has a function to transmit in almost 100% the P-polarization incident to the separating plane and to reflect in almost 100% the S-polarization. In this case, it is possible that a part of the light is reflected by the polarization prism 104 as the S-polarization and a part of the light is transmitted as the P-polarization. The reflected light is converted to a circular polarization through a quarter-wave plate 105 and is then collected to a recording film on the optical disk 108 with an objective lens 107 mounted to a two-dimensional actuator 106. The reflected light from the optical disk returns the same optical path as the collimated light converted with the objective lens 107 and enters the polarization prism 104 as the linear polarization that is rotated by 90° in the polarization direction from the original incident light with the quarter-wave plate 105. Thereby, since polarization is rotated, the reflected light from the optical disk 108 passes through a polarization prism 104 as the P-polarization and enters the polarization prism 113. Meanwhile, the P-polarization having passed the polarization prism 104 in the light from the laser diode 101 enters a corner cube prism 112 mounted to a one dimensional actuator 111 which can move in the optical axis direction. As will be explained later, since polarization and phase are disturbed by reflection at the corner cube, a compensation element 122 is inserted against such disturbance. This compensation element also has a role to change polarization of the returned light to the S-polarization. The returned light of S-polarization returns the same optical path with the same optical axis to enter the polarization prism 104. Thereby, since polarization is rotated, the reflected light from the corner cube prism 112 is reflected by the polarization prism 104 and enters a polarization prism 113 superimposing on the reflected light from the optical disk 108. However, the reflected light from the optical disk and the reflected light from the corner cube prism 112 are mutually in the linear polarizations orthogonally crossing with each other. Unlike the polarization prism 104, the polarization prism 113 has a function to transmit a part of the P-polarization and reflects in almost 100% the S-polarization. Therefore, the reflected light from the corner cube prism 112 is reflected in almost 100%, while the reflected light from the disk partially passes through the polarization prism 113 and a part of this reflected light is reflected. The reflected light enters a polarization phase conversion splitting element 114 and is divided to four lights of different phases with interference by a couple of lights while the reflected light from the optical disk 108 and the reflected light from the corner cube prism 112 are superimposed thereon and the four split lights are individually detected in four light receiving parts provided on a 4-split light detector 116 with a collecting lens 115. In the figure, four divided lights are simplified so that the lights are separated and collected in the two light fluxes. However, actually, the four light fluxes are collected. An RF calculation circuit 120 outputs a reproduced RF signal (RFS) from the detected signal. On the other hand, the reflected light from the optical disk 108 having passed the polarization prism 113 is given astigmatism with a cylindrical lens 118 and is then collected to a 4-split light detector 119 and a servo signal calculation circuit 121 outputs, from the output signal thereof, focus error signal (FES) and a tracking error signal (TES). The focus error signal is fed back to a focus actuating terminal of the two-dimensional actuator 106 mounting the objective lens 107 and thereby a focus position is closed-loop controlled. Moreover, the focus error signal is also fed back to the one dimensional actuator 111 mounting the corner cube prism 112 and the corner cube prism 112 is also driven in conjunction with the objective lens 107. Accordingly, optical path length difference between the signal light reflected from the optical disk 108 and the reference light reflected from the corner cube prism 112 can be maintained to almost zero. Since coherence length of an ordinary laser diode is about several tens of µm, it is enough when adjustment accuracy of optical path length difference is within this range. The tracking error signal is fed back to a tracking actuating terminal of the two dimensional actuator mounting the objective lens 107 and is then closed-loop controlled.

Figure 2:
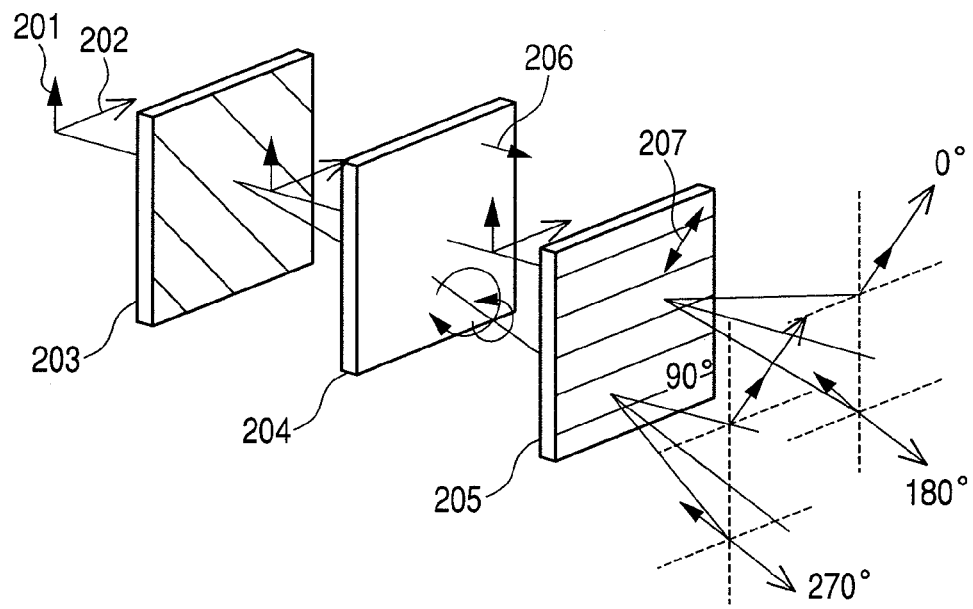
FIG. 2 is an explanatory diagram of a polarization phase conversion separation element.

FIG. 2 is an explanatory diagram showing a structure and a function of a polarization phase conversion separation element. The polarization phase conversion splitting element 114 is constituted with a non-polarizing grating 203 as a non-polarizing splitting element, an angular selective polarization conversion element 204 as a selective polarization conversion element, and a polarization splitting grating 205 as a polarization splitting element. In FIG. 1, these elements are shown in the integrated state, but these are separated here for the convenience of explanation. The same function may be attained even in the case where these are separated or integrated. When the signal light and the reference light enter the polarizing grating 203 in the manner that the signal light polarization direction 201 is orthogonally crossing the reference light polarization direction 202, a couple of lights are respectively split into a couple of light with different traveling directions without relation to the polarization direction. Such separation can be realized easily by blazing the non-polarizing grating 203. One is a zero-order light travelling in straight and the other is a first order diffracted light diffracted in the predetermined diffraction angle. Next, when these lights enter the angular selective polarization conversion element 204, any phase difference is not generated in the zero-order light traveling in straight but a phase difference is generated in the first order diffracted light inputted with a certain tilt and the signal light and the reference light are converted into circular polarizations in inversed rotating directions. Such conversion is possible when the optical axis 206 has uniaxial anisotropy for the plane of the angular selective polarization conversion element and the plane including diffracted light axis and the incident light axis has the angle of 45° respectively for the polarization directions of the signal light and the reference light. Thereby, both signal light and reference light in the angular selective polarization conversion element respectively have the P-polarization and S-polarization equally in the first order diffracted lights. Therefore, a phase difference for attaining circular polarization can be uniquely determined with anisotropy of refractive index (difference between refractive indices for polarization perpendicular and parallel to optical axis) and incident angle. Moreover, the emitted light of the angular selective polarization conversion element 204 is incident to the polarization splitting element 205. As the polarization splitting grating, an element described in the Japanese Patent No. 3832243, for example, may be used. This element can easily be realized by forming a blazed grating with an anisotropic material such as liquid crystal, lithium niobate, and quartz, etc. Namely, such materials have different refractive indices depending on the polarization direction and therefore the polarization splitting grating element is enough when it is arranged to provide inverted phase distributions caused by the grating in accordance with a certain polarization direction and that orthogonally crossing thereto. Accordingly, it is possible to realize the polarization direction where the plus first order diffracted light and the minus first order diffracted light are crossing orthogonally. Otherwise, an element that can be formed by laminating anisotropic optical crystals such as the Wollaston prism may be used in place of the element explained above. As explained above, phase difference in the interference between the signal light and the reference light in the divided four lights can be set respectively to 0°, 90°, 180°, and 270°.

Figure 3:
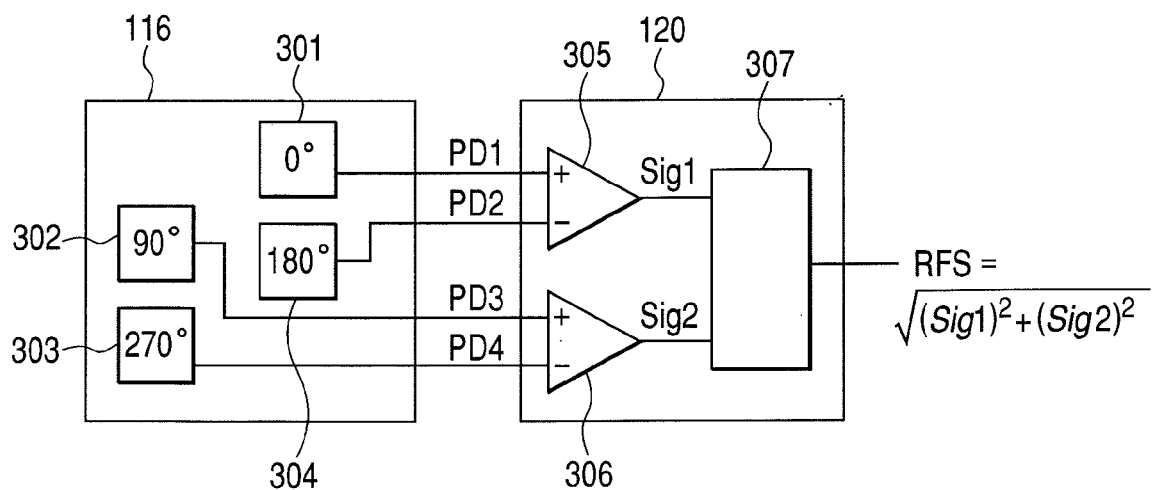
FIG. 3 is an explanatory diagram of an RF signal light receiving part and a calculation circuit.

FIG. 3 is a diagram showing an arrangement of the light-receiving part of the 4-split light detector 116 and an arrangement and a function of the RF signal calculation circuit 120 in FIG. 1. The 4-split light detector 116 includes four light-receiving parts 301, 302, 303, and 304 for receiving four lights shown in FIG. 2 and these receiving parts respectively receive the lights having interference intensity in the interference phase differences of 0°, 90°, 270°, and 180°. The respective outputs are applied to differential amplifiers 305, 306 for differential calculation. Thereafter, the RF signal can be detected with a root sum squares calculation circuit 307.

Figure 4A:
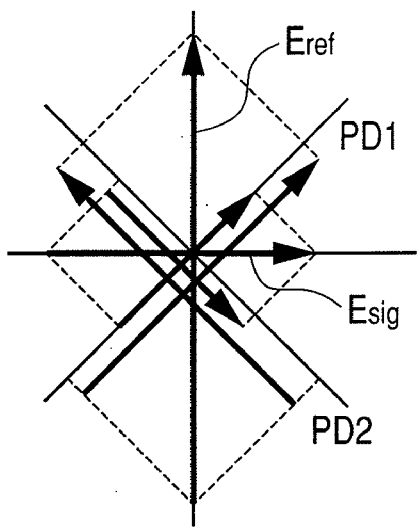
FIG. 4A and FIG. 4B are explanatory diagrams of interference phase difference in the polarization state in the linear polarization side and the circular polarization side.
Figure 4B:
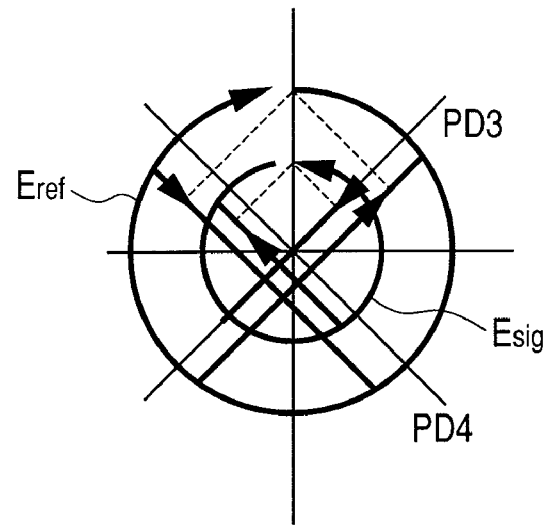

FIGS. 4A and 4B are diagrams for explaining that phase difference by interference of four lights are generated in 0°, 180°, 90°, and 270° with the polarization phase conversion splitting element shown in FIG. 2. In these figures, Eref indicates an electric field vector of the reference light and Esig, an electric field vector of the signal light. FIG. 4A shows the state of polarization in the linear polarization side, while FIG. 4B, the state of polarization in the circular polarization side in FIG. 2. Since the reference light and the signal light are orthogonally crossing in the polarization direction, a projected vector to each polarization separated by the polarization splitting grating is in the same direction in the side of PD1 but in the inverted direction in the side of PD2. Accordingly, interference occurs between the reference light and the signal light when the phase difference is 0° in PD1 and is 180° in PD2. Next, in FIG. 4B, since both reference light and the signal light are respectively in the circular polarization in different rotating directions, projected vectors to the side of PD3 and that to the side of PD4 are not located at the end part of the line indicating the vector but are deviated to the intermediate location at the front ends of arrow marks. In this case, a phase difference becomes 90° and 270°, respectively.

Moreover, these relations are indicated with numerical equations and amplification of the reproduced RF signal with the reference light will be explained with calculation shown in FIG. 3. Interference intensities of incident lights to PD1, PD2, PD3, and PD4 may respectively be expressed with the following numerical equations.

$$I_{PD1} = \left|\frac{1}{2}E_{sig} + \frac{1}{2}E_{ref}\right|^2 \quad (1)$$
$$= \frac{1}{4}|E_{sig}|^2 + \frac{1}{4}|E_{ref}|^2 + \frac{1}{2}|E_{sig}||E_{ref}|\cos(\varphi_{sig} - \varphi_{ref})$$

$$I_{PD2} = \left|\frac{1}{2}E_{sig} - \frac{1}{2}E_{ref}\right|^2 \quad (2)$$
$$= \frac{1}{4}|E_{sig}|^2 + \frac{1}{4}|E_{ref}|^2 - \frac{1}{2}|E_{sig}||E_{ref}|\cos(\varphi_{sig} - \varphi_{ref})$$

$$I_{PD3} = \frac{1}{8}|(1-i)E_{sig} + (1+i)E_{ref}|^2 \quad (3)$$
$$= \frac{1}{4}|E_{sig}|^2 + \frac{1}{4}|E_{ref}|^2 + \frac{1}{2}|E_{sig}||E_{ref}|\sin(\varphi_{sig} - \varphi_{ref})$$

$$I_{PD4} = \frac{1}{8}|(1+i)E_{sig} + (1-i)E_{ref}|^2 \quad (4)$$
$$= \frac{1}{4}|E_{sig}|^2 + \frac{1}{4}|E_{ref}|^2 - \frac{1}{2}|E_{sig}||E_{ref}|\sin(\varphi_{sig} - \varphi_{ref})$$

From these numerical equations, the output signals Sig1 and Sig2 of the differential amplifiers 305, 306 in FIG. 3 may be expressed as follows.

$$Sig1 = I_{PD1} - I_{PD2} = |E_{sig}||E_{ref}|\cos(\phi_{sig} - \phi_{ref}) \quad (5)$$

$$Sig1 = I_{PD3} - I_{PD4} = |E_{sig}||E_{ref}|\sin(\phi_{sig} - \phi_{ref}) \quad (6)$$

Therefore, the signal obtained by amplifying electric field amplitude of the regeneration signal with electric field amplitude of the reference signal can be detected as expressed with the following numerical equation.

$$S = \sqrt{(Sig1)^2 + (Sig2)^2} \quad (7)$$
$$= \sqrt{(I_{PD1} - I_{PD2})^2 + (I_{PD3} - I_{PD4})^2}$$
$$= |E_{sig}||E_{ref}|$$

Here, it can be understood by conducting such sum squares calculation that phase difference does not give any influence on the reference light and signal light obtained finally. Accordingly, adjustment of optical path length difference as small as a fraction of wavelength that has been conducted in the related art is no longer required in the present invention. Here, sum squares of a couple of differential signals may also be provided as outputs, which omits the root calculation explained above. In the case where the root calculation is not conducted, since a signal that is proportional to signal intensity can be obtained, the signal waveform that is identical to that in the CD, DVD, and Blue-ray disk in the related art can be obtained. Since an output when the root calculation is conducted is proportional to a root of the signal light intensity, this output has the signal waveform identical to that of a magneto-optical disk signal in the related art.

Figure 5:
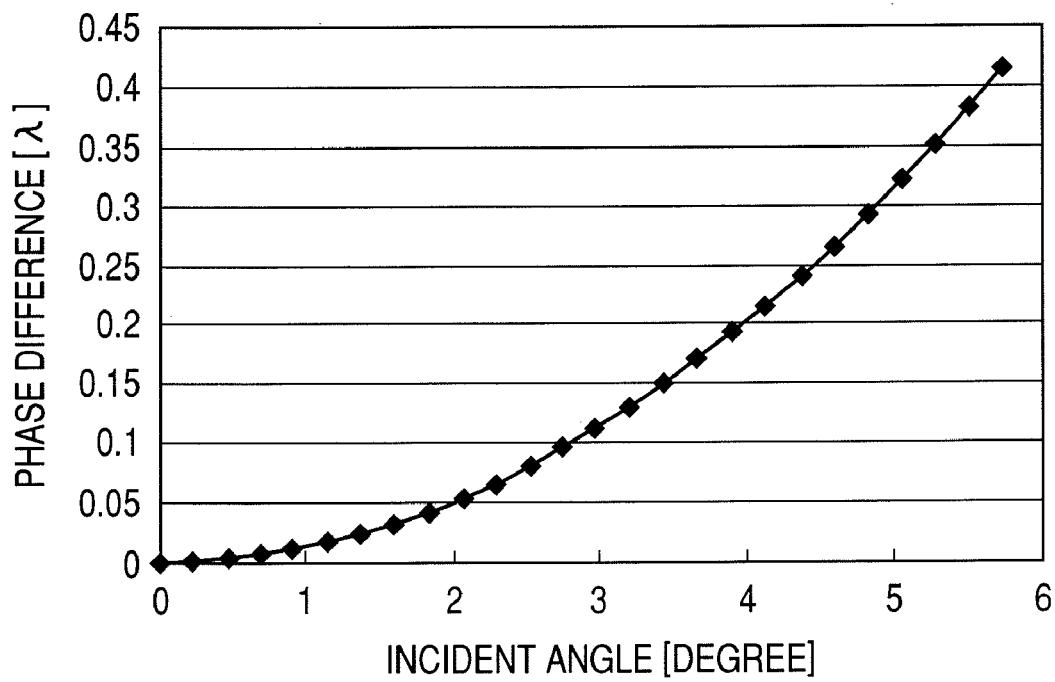
FIG. 5 shows an example of an incident angle vs. phase difference characteristic of an angular selective polarization conversion element.

FIG. 5 shows results of calculations of polarization phase difference for incident angles of light using lithium niobate as an example, as the angular selective polarization conversion element 204. Here, setting for the calculation has been conducted as follows. Namely, extra-ordinary refractive index is 2.200, ordinary refractive index is 2.286, and thickness of element is 1 mm. Therefore, it is obvious that only the diffracted light can be selectively converted to the circular polarization light by adjusting a diffraction angle of the non-polarizing grating to result in the incident angle of about 4.5°.

Figure 6:
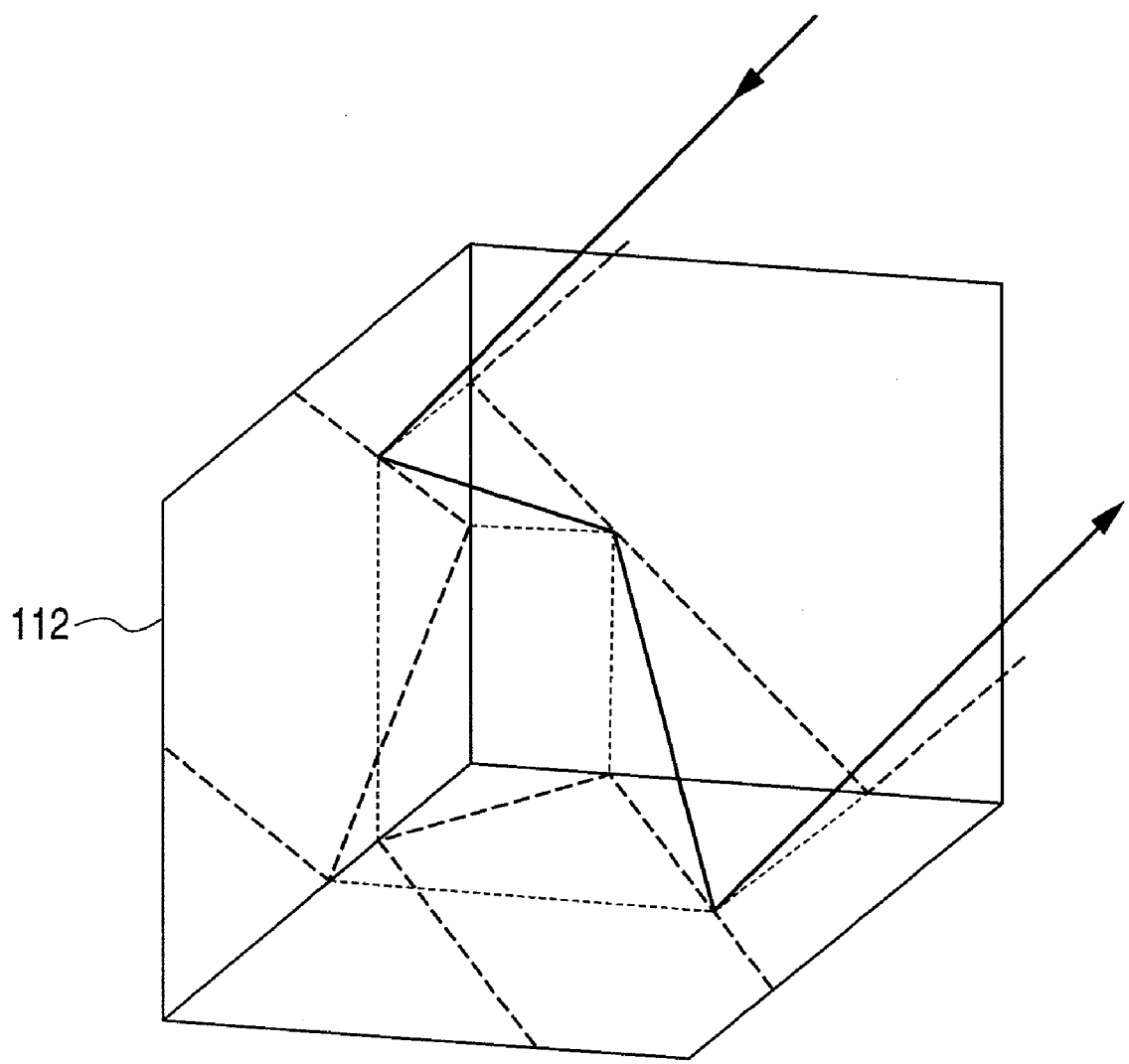
FIG. 6 is an explanatory diagram of reflected light lines of a corner cube.

FIG. 6 is the explanatory diagram for explaining that the light incident to the reflection surface of the corner cube prism is reflected passing the same optical path. The incident light beam is reflected basically passing all planes of the adjacent three planes through reflection of three times. A solid line in FIG. 6 indicates a light beam, a broken line indicates a projection to each plane of the light beam, and a dotted line indicates an auxiliary line showing the reflecting position. It is also apparent that projection of the light beam at each plane forms a part of the parallelogram and the lights are reflected in the same direction because of its symmetry. However, the incident light and the reflected light are parallel but show a certain positional deviation. In order to overcome this problem, it is required that the light is radiated by setting the optical axis toward the vertex and any displacement of light flux must be eliminated as a whole. In this case, it can also be thought that the light is scattered at the vertex or edge, but a sharp edge must be formed in view of mitigating influence of such scattering of light. Since three edge lines are appearing in the reflected light, images of six edges can be observed.

FIG. 7A is a front view of the corner cube. A thick line indicates an edge line of a plane and a dotted line, an auxiliary line for explanation. The light entering the corner cube prism returns after reflection of three times as explained above, respective reflections are total reflections, and a phase difference is generated depending on polarization of the incident light. As a result, the returning light is different from the incident light in its polarization. FIGS. 7A, 7B, and 7C respectively show the axes of the polarization direction of the light when the respective lights are reflected. The light entering from six regions (1) to (6) in FIG. 7A are reflected at the reflection plane in different sequence, these lights are returned respectively in different polarizations. In order to guide the returned light from the corner cube to the detector as the reference light, this returned light must be returned as the light of S-polarization not depending on the incident place. Moreover, the returned light from each region must be set in the identical phase with each other. These conditions can be achieved with the polarization phase compensation element 102, existing only in the regions (2), (3), and (6) as shown in FIG. 7, that is constituted by sequentially arranging a phase plate 701 for giving an adequate phase difference to the S-polarization and the P-polarization, a quarter-wave plate 702 to which the incident light and the reflected light are applied to the entire part of the plate, and a half-wave plate 703 that varies the optical axis direction depending on each region. As an example, the setting values when a material of the corner cube is BK7 and wavelength of light is 405 nm are listed in the table 1. A phase difference of the phase plate indicates a delay of the S-polarization for the P-polarization. The optical axis of the quarter-wave plate and the half-wave plate unit the direction of fast axis for the perpendicular direction when it is seen from the incident light direction (the counter-clockwise direction is the positive direction).

TABLE 1

Example of Setting Values of Polarization Phase Compensation Element

| Region | Phase Difference of Phase Plate | Optical Axis of Quarter-wave Plate | Optical Axis of Half-wave Plate |
|--------|-------------------------------|-----------------------------------|-------------------------------|
| (1) | — | −17.72° | 28.64° |
| (2) | 33.29° | −17.72° | −1.36° |
| (3) | 33.29° | −17.72° | 58.64° |
| (4) | — | −17.72° | 58.64° |
| (5) | — | −17.72° | −1.36° |
| (6) | 33.29° | −17.72° | 28.64° |

Figure 8:
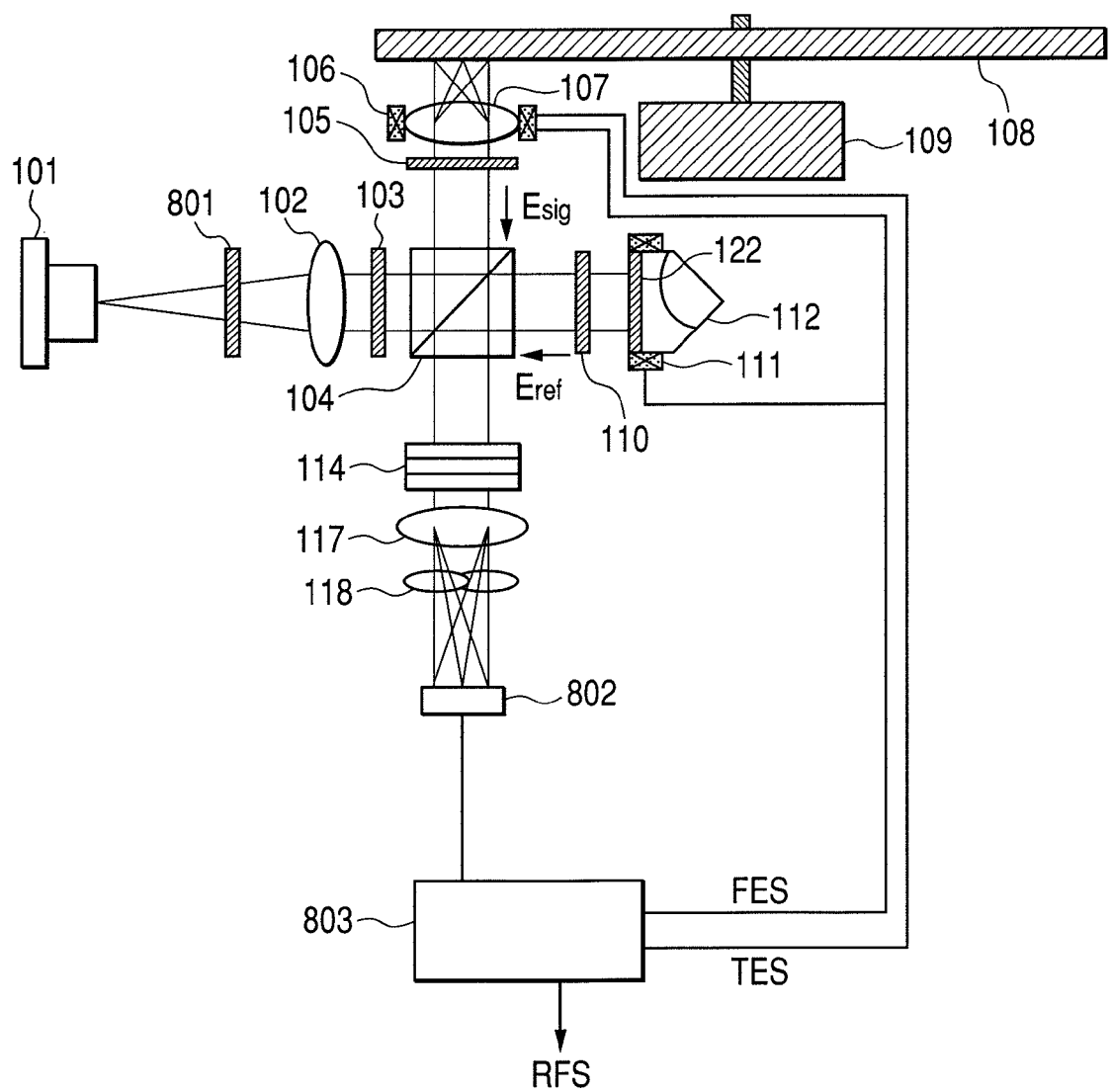
FIG. 8 shows an embodiment for conducting tracking detection by a differential push-pull method.

FIG. 8 shows another embodiment of the present invention in which a differential push-pull method is used as a tracking error signal detection system. In this differential push-pull method, three light beams generated by a grating 801 are incident to a disk. When a main spot on the disk is arranged on a recorded track, rotation adjustment of the grating 801 is conducted to arrange a couple of sub-spots between the adjacent tracks. Here, three beams of the reference light are used and these lights are respectively interfered with corresponding signal lights and the tracking error signal is also amplified with differential calculation. Moreover, the focus error signal in the astigmatism method is also amplified with differential detection with 4-split detection of the zero-order light of the grating 801 keeping each interference phase difference. The amplified focus error signal is received with a light detector 802 formed in the shape of a package to conduct signal calculation.

Figure 9:
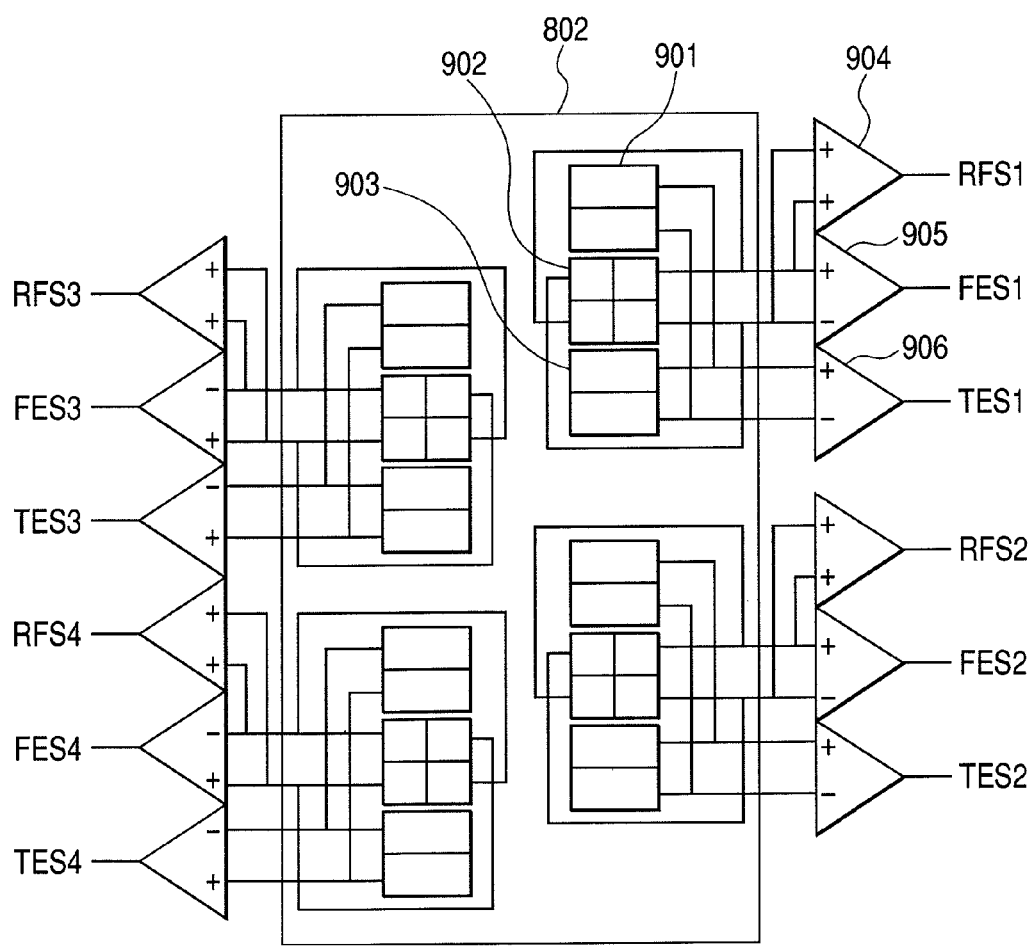
FIG. 9 shows a structure for detecting an RF signal, a focus error signal, and a tracking error signal in each interference phase difference.

FIG. 9 corresponds to FIG. 3 and shows a circuit structure for respectively detecting four RF signals (RFS1, RFS2, RFS3, RFS4), focus error signals (FES1, FES2, FES3, FES4) and tracking error signals (TES1, TES2, TES3, TES4), using a 4-split optical detector 901 for main beam, 2-split optical detectors 901, 903 for sub-beams, a summing amplifier 904, and differential amplifiers 905, 906 for the four interference lights having interference phase differences of 0°, 180°, 90°, and 270° of the signal light and the reference light. These differential amplifier circuits, etc. are built in a signal calculation circuit 803 of FIG. 8.

Figure 10:
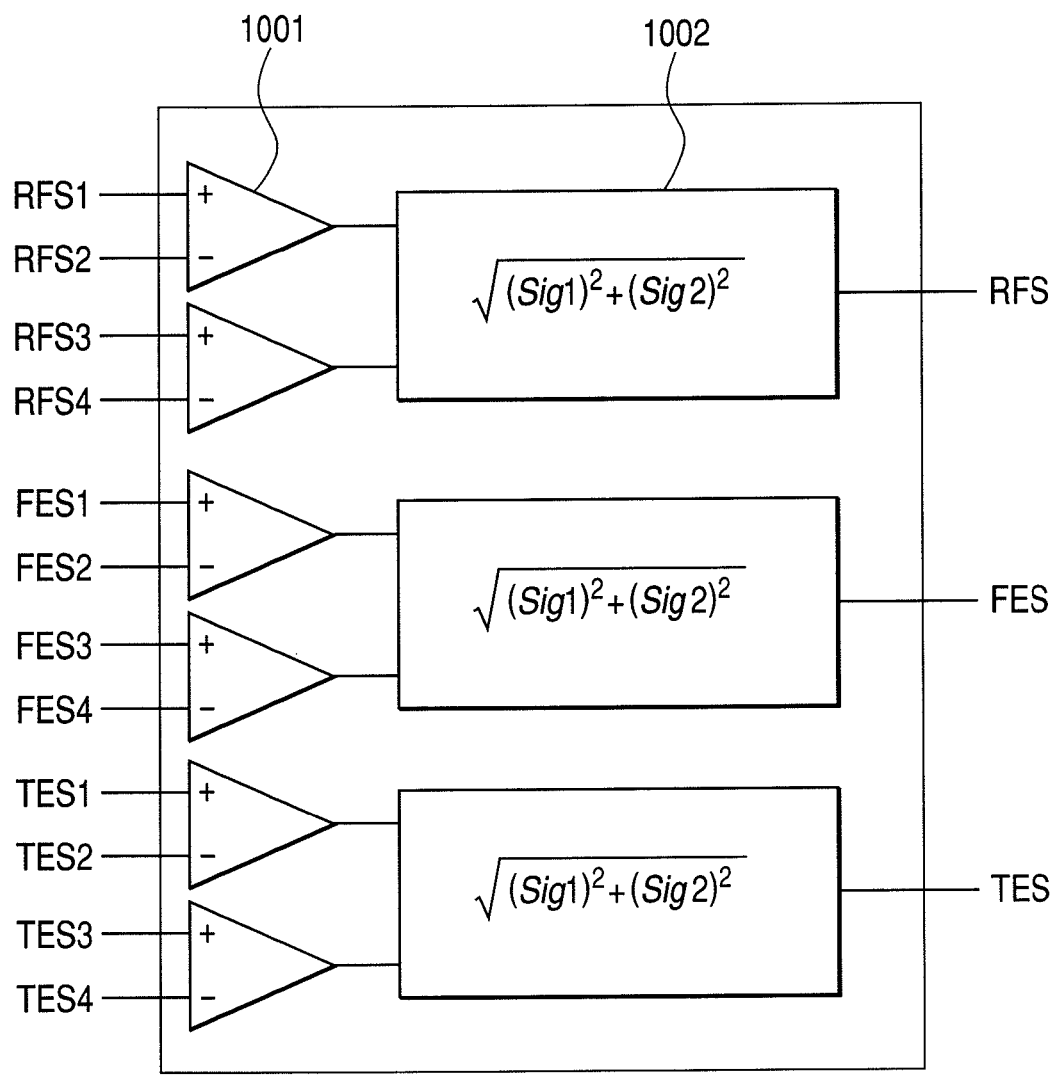
FIG. 10 shows a circuit structure for signal amplification due to differential detection.

FIG. 10 shows a circuit structure for respectively detecting the amplified signal from each interference phase difference shown in FIG. 9 with the differential detection and the root sum squares calculation. This circuit structure can also obtain respectively the RF signal, focus error signal, and tracking error signal with the root sum square calculation circuit after obtaining the differential signals of 0° and 180°, 90° and 270° with a differential amplifier 1001. The structure explained above is preferential in reduction of crosstalk, because the signal by the light from the layer to be detected can be selectively amplified for leakage signal from the layer defocused to a large extent in the case of the multilayer disk.

Figure 11:
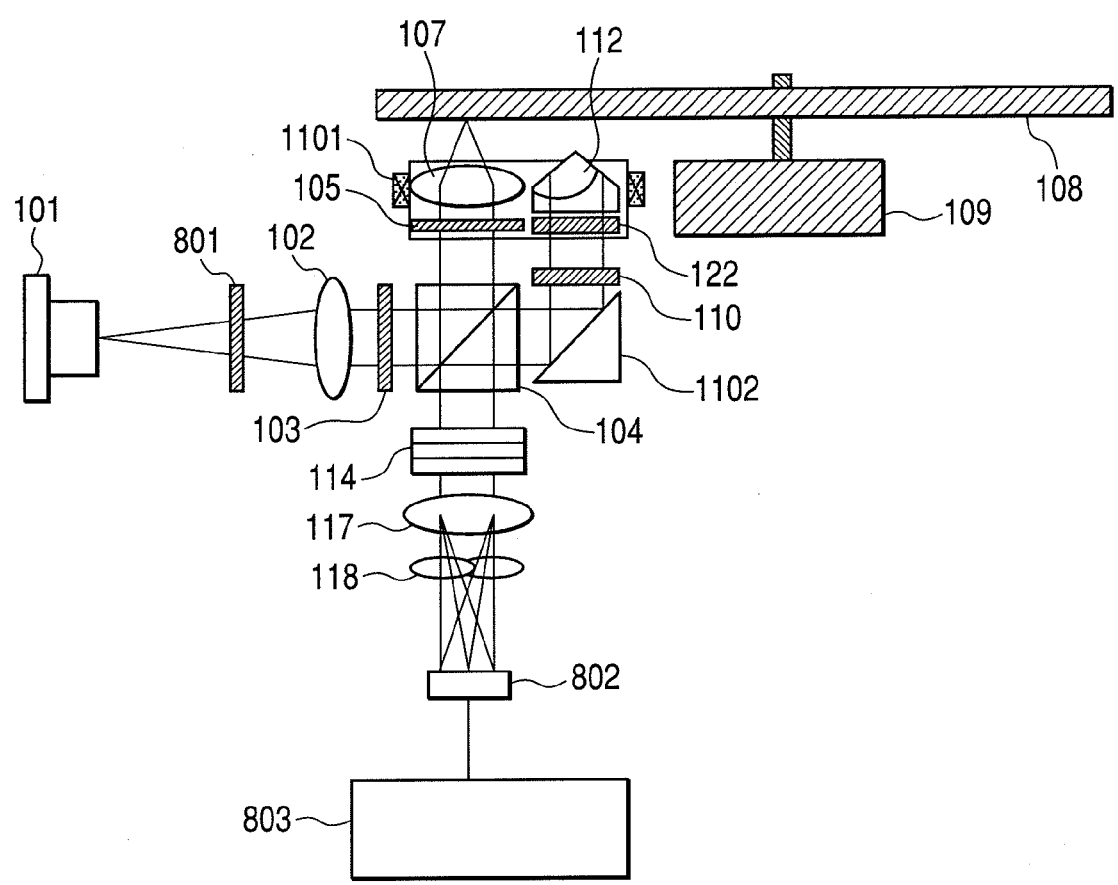
FIG. 11 shows an embodiment where the corner cube is mounted to an actuator with an objective lens.

FIG. 11 shows an optical system attained by improving the system shown in FIG. 8. In this optical system, the corner cube prism 112 is mounted to an objective lens actuator 1101 with the objective lens 107. Thereby, if the objective lens 107 is driven in the optical axis direction following surface fluctuation of the optical disk 108 under the condition that a focus servo is in the ON state, the corner cube prism 112 is also driven simultaneously, bringing about a merit that the optical length difference of the signal light and the reference light does not basically change. In recent years, a so-called 2-lens actuator has been put into the practical use. In this actuator, an objective lens for BD and an objective lens assuring compatibility for both DVD and CD can be mounted together. The present embodiment can be realized easily by mounting the corner cube prism 112 to the position of one lens of such actuator. By mounting a lens compatible for three systems of BD/DVD/CD on the actuator with the corner cube prism, plural kinds of optical disks can be applied.

Figure 12:
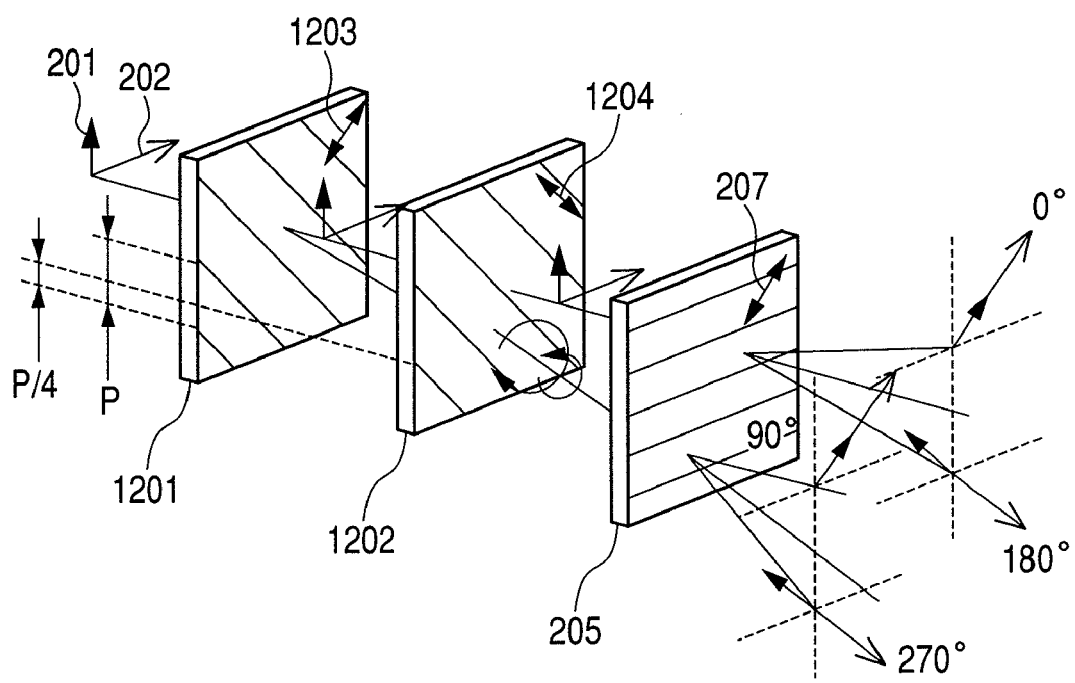
FIG. 12 shows an embodiment where a couple of sheets of polarizing grating are used in place of an angular selective polarization conversion element.

FIG. 12 shows another embodiment different from the angular selective circular polarization plate shown in FIG. 2. Here, the non-polarizing grating 203 of FIG. 2 is replaced with the polarizing grating 1201 and moreover the angular selective circular polarization plate 204 is replaced with the second polarizing grating 1202. Respective optical axis directions 1203, 1204 are crossed orthogonally as shown in the figure. The subsequent polarizing grating 207 is arranged in the same layout as that of FIG. 2. Thereby, the light of linear polarization along the optical axis 1203 is partially diffracted with the polarizing grating 1201 and orthogonal polarization is not diffracted. Moreover, a part of the linear polarization light along the optical axis 1204 is diffracted with the second polarizing grating 1202 and orthogonal polarization is not diffracted. Accordingly, the lights diffracted with the first and second polarizing gratings are mutually polarized orthogonally and the phase of the grating arrangement is deviated only by ¼ of the period P of grating (90°) as shown in FIG. 12. Therefore, since the phases of diffracted lights are also deviated by 90°, the polarization state when a couple of diffracted lights are combined becomes circular polarization. Here, only one diffracted light is indicated and it can be easily realized by blazing the diffraction grating such as the step grating and sawtooth grating. Moreover, the polarization state of the light not diffracted may be maintained in the state same as the polarization state of the first incident light by setting the diffraction efficiency of the polarization grating 1201 equal to that of the polarization grating 1202 for orthogonal polarization. In these figures, elements are separated for the convenience of explanation but these elements can be integrated through lamination in the actual optical system. In the structure explained above, the non-polarizing grating is replaced with the polarizing grating, in comparison with the structure of FIG. 2, but manufacturing cost can be lowered a little, because the angular selective circular polarization plate formed of a comparatively expensive anisotropic optical crystal is replaced with the polarizing grating that can be formed easily by solidification of liquid crystal. In addition, it is required to enlarge an incident angle or to make thicker the element in order to generate phase difference of 90° in the angular selective circular polarization plate. However, in this embodiment, since a phase difference of the circular polarization can be realized with the desired grating pitch, it is preferential for reduction in size of the element.

Figure 13:
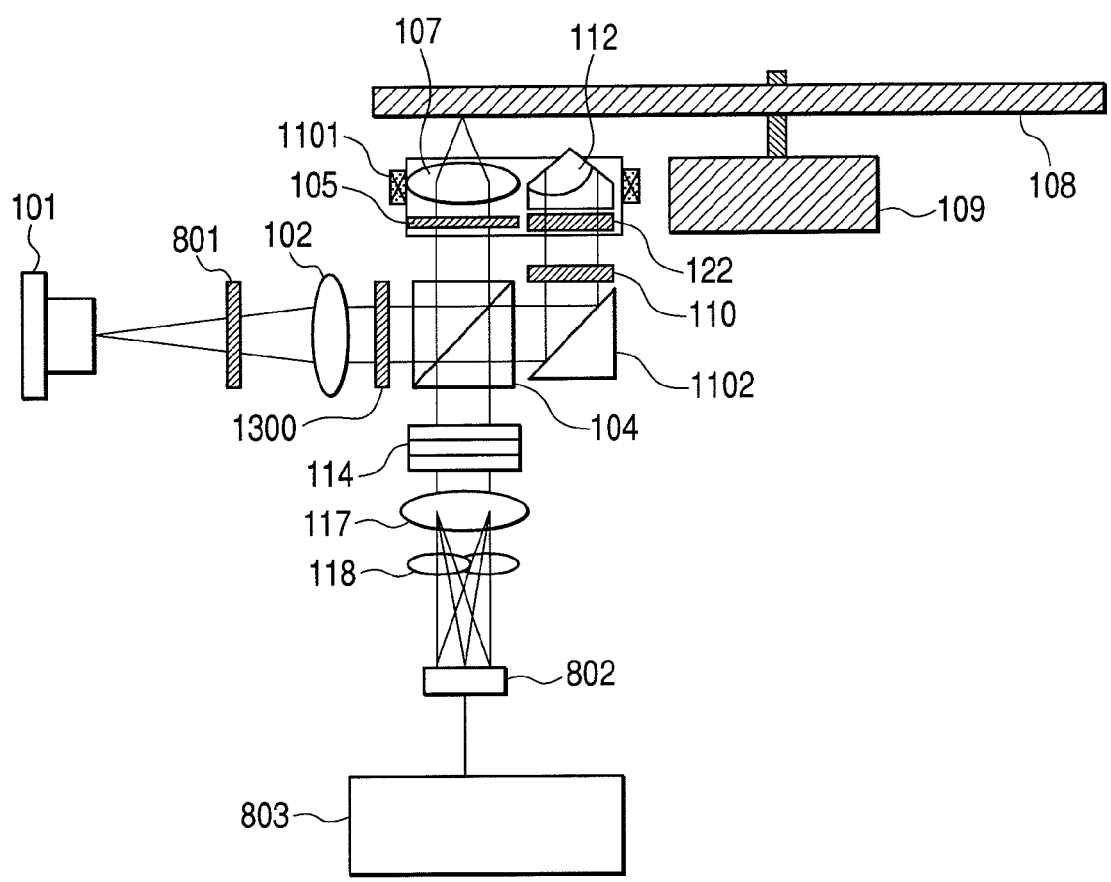
FIG. 13 shows an embodiment where a half-wave plate 103 is replaced with the polarization conversion element 1300 in the embodiment of claim 11.

FIG. 13 shows an embodiment attained by replacing the half-wave plate 103 with the polarization conversion element 1300 in the embodiment shown in FIG. 11. Thereby, a splitting ratio of the signal light reflected by the polarization prism 104 and the reference light can be varied. Accordingly, in the case of recording to the optical disk 108, the optical disk is irradiated with all light of the laser diode for effective recording by changing the splitting ratio. In addition, in the case of signal readout from the optical disk 108, the signal can be amplified by increasing intensity ratio of the signal light and reference light.

Figure 14:
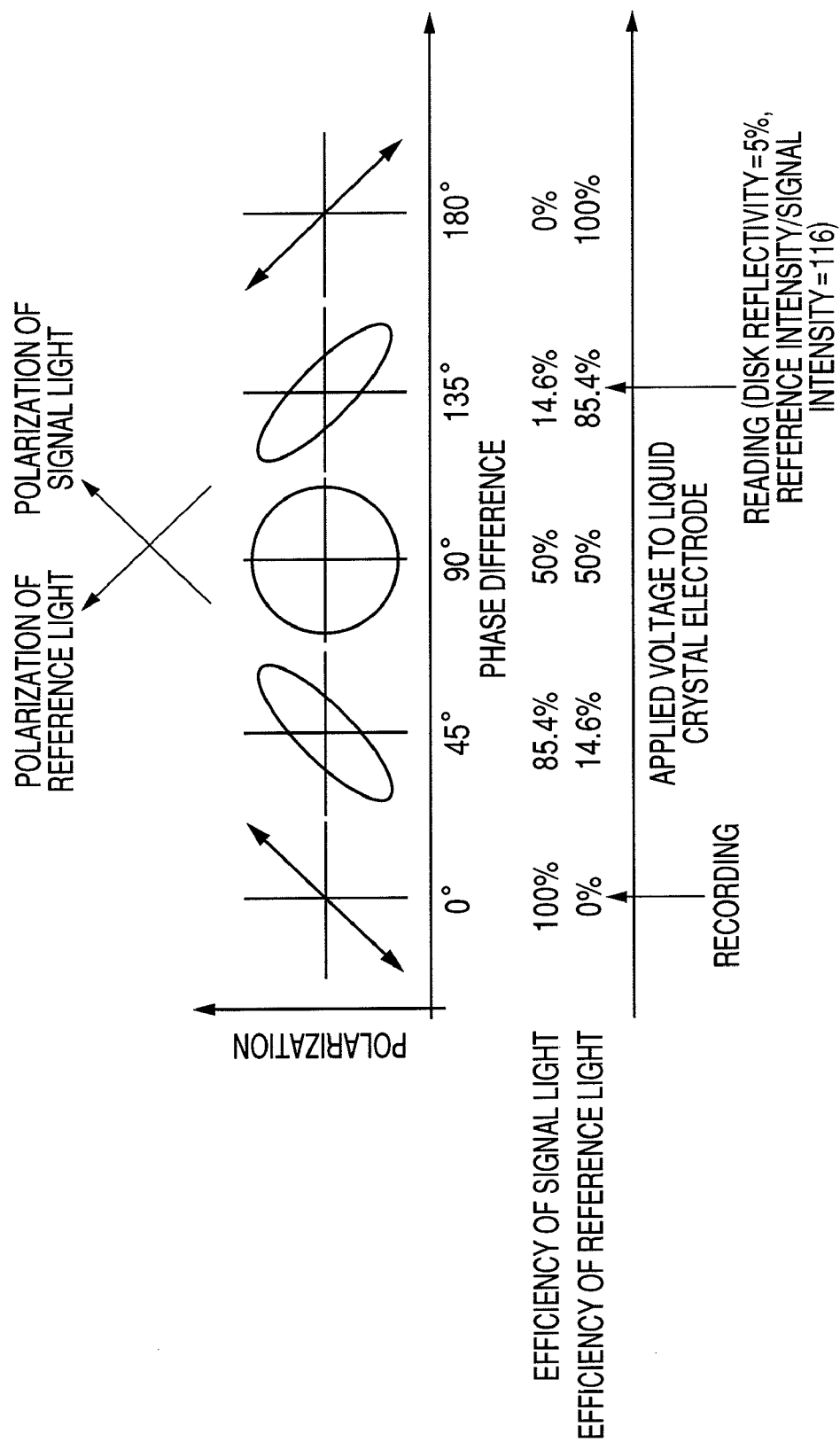
FIG. 14 shows polarization state and intensity ratio of signal light and reference light when the polarization conversion element 1300 in claim 13 is used.

FIG. 14 shows polarization of the light after passing through the polarization conversion element 1300 in FIG. 13 and intensity ratio of the signal light and the reference light. This figure shows that polarization can be changed to the signal readout state where intensity ratio of the reference light is enlarged from the state where the efficiency of the signal light is set to 100% by varying an applied voltage to a liquid crystal element. In order to change the splitting ratio, alternating voltage is applied to the liquid crystal. Here, it may be apparent that when a phase difference between the signal light and the reference light is set, for example, to 135° as an example of the reproducing operation, a ratio of the signal light and the reference light can be shared to 14.6%:85.4%. In this case, it is also apparent when it is assumed that intensity reflectivity of disk is 5%, of the intensity of the reference light incident to the detection optical system is 116 times higher than that of the signal light. Here, a signal gain becomes 10.8 times.

Figure 15:
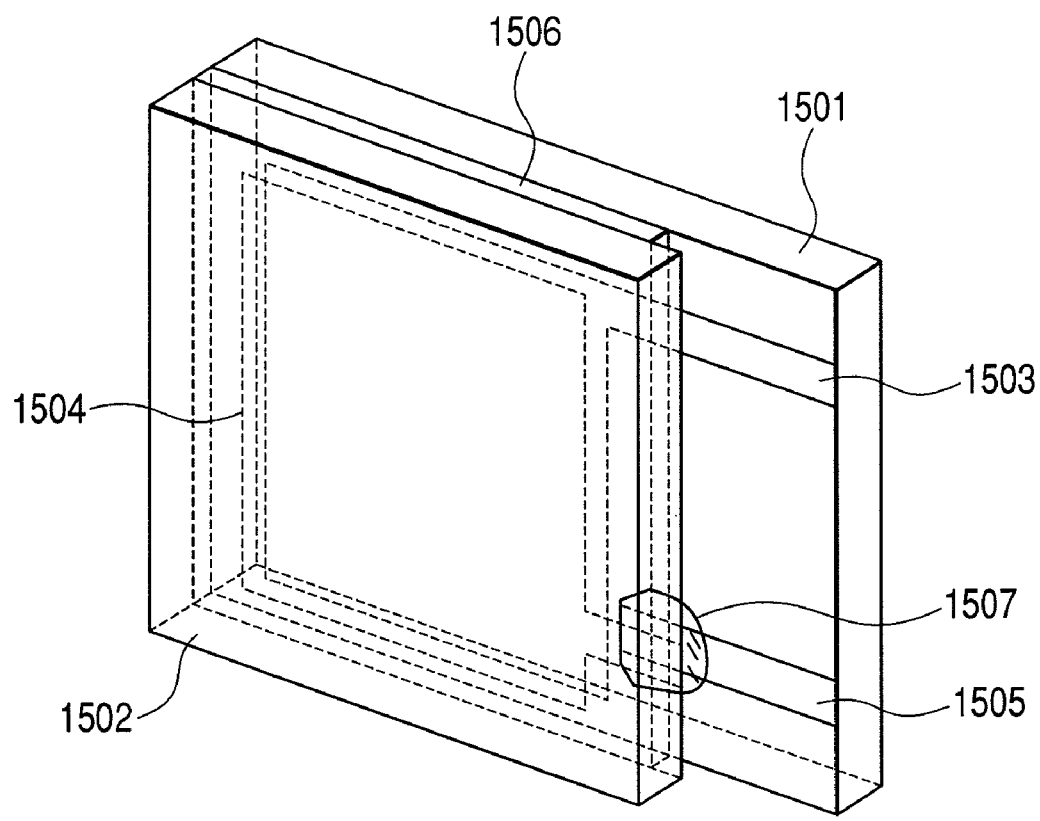
FIG. 15 shows a structure of a liquid crystal element when the liquid crystal element is used as the polarization conversion element.
Figure 16:
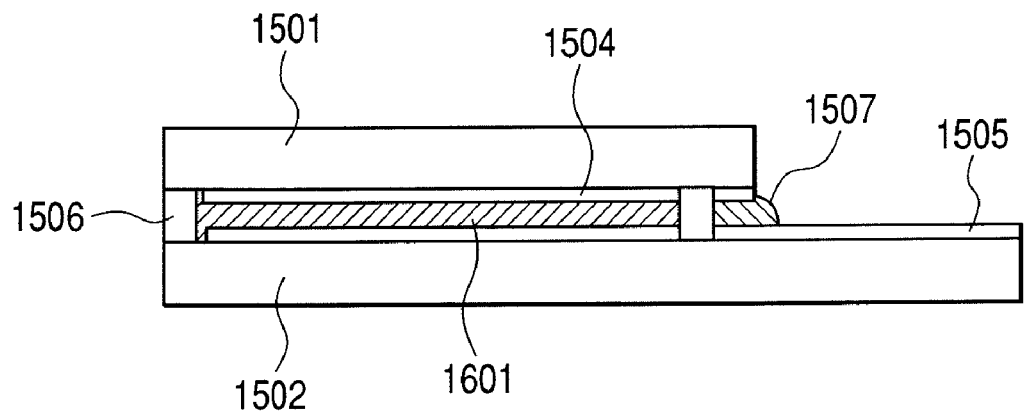
FIG. 16 is a side view of FIG. 15.

FIG. 15 and FIG. 16 respectively show a structure of element in the case where a liquid crystal element is used as the polarization conversion element in FIG. 13. The liquid crystal element has a structure that the liquid crystal is sandwiched with glass plates 1501, 1502 and these are sealed with a sealant 1506. In this case, the glass substrates 1501 and 1502 are formed in different sizes so that transparent electrodes 1503, 1505 are exposed from the plane where the glass substrate 1501 is exposed. The transparent electrode 1503 is patterned to a side surface of liquid crystal of the glass substrate 1501 and the transparent electrode 1505 is formed as the electrode for electrical connection with the transparent electrode 1504 patterned to the side surface of liquid crystal of glass substrate 1502 via a conductive resin 1507. Since an alternating voltage is applied to the liquid crystal with the transparent electrodes 1503, 1504, a phase difference between a couple of orthogonally crossing linear polarizations that have been determined in direction with rubbing process of the liquid crystal can be varied.

FIG. 16 is a side view of the liquid crystal element of FIG. 15. This figure indicates liquid crystal 1601 is sandwiched with the glass substrates 1501 and 1502.

Figure 17:
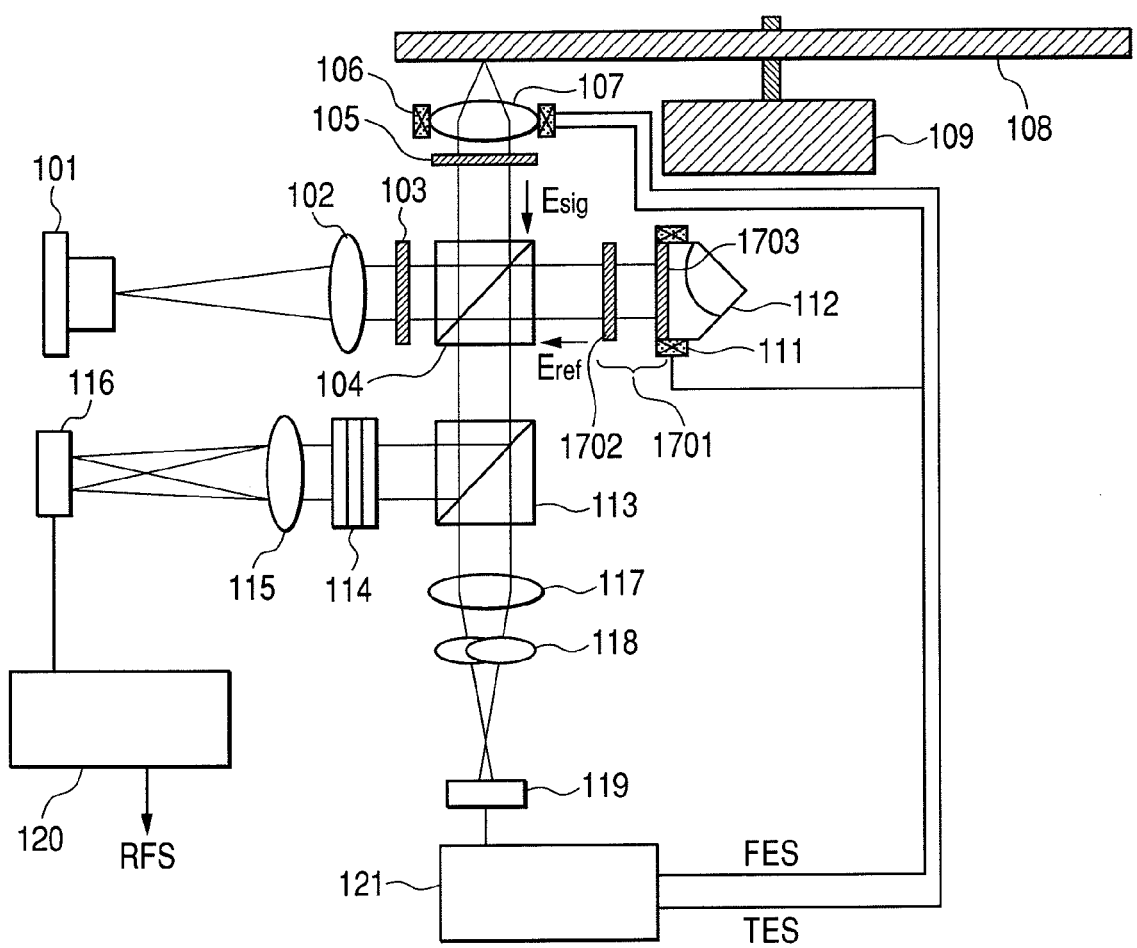
FIG. 17 shows an embodiment where a polarization phase compensation element 122 is replaced with a polarization compensation element 1701 in the embodiment of FIG. 1.

FIG. 17 shows another embodiment modified from that of FIG. 1 by replacing the polarization phase compensation element 122 with a polarization compensation element 1701. The polarization compensation element 1701 is formed by eliminating the phase plate from the polarization phase compensation element 122 and is constituted with a quarter-wave plate 1702 and a half-wave plate 1703. In this case, since phase of the reference light is different in the regions (1), (4), (5) and the regions (2), (3), (6) shown in FIG. 7, the order of interference signal is lowered. However, since phase difference among the regions is as small as 33.29 degrees, order of interference can be set up to about 95% in comparison with the case where the phase is identical in all regions and therefore sufficient interference signal can be obtained. In addition, since the polarization phase compensation element 122 is required to show that the divided regions of the phase plate and half-wave plate can be seen to be overlapped with the regions of the corner cube when they are viewed from the direction of optical axis of the incident light, the polarization phase compensation element 122 and corner cube prism showed be integrally mounted to the actuator 111. If not, polarization of returned light is varied or the interference signal is modulated due to displacement generated when the actuator 111 is driven. However, in this embodiment, only the half-wave plate 1703 must be mounted to the actuator 111 and the quarter-wave plate 1702 can be arranged separately from the actuator because this quarter-wave plate 1702 does not include any divided region. Therefore, weight of a moving part to the actuator 111 can be suppressed and lowering of its characteristic can also be suppressed.

Figure 18:
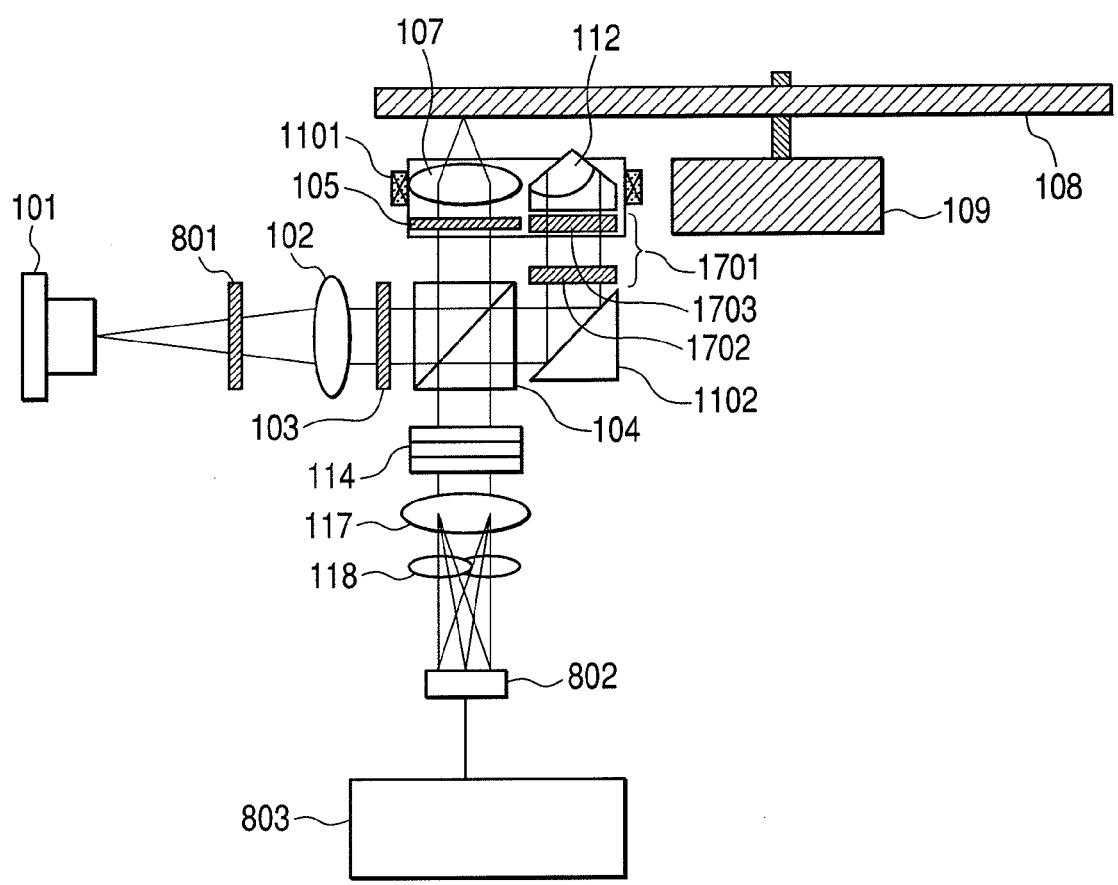
FIG. 18 shows an embodiment where the polarization phase compensation element 122 is replaced with the polarization compensation element 1701 in the embodiment of FIG. 11.

FIG. 18 shows still another embodiment modified from that of FIG. 11 by replacing the polarization phase compensation element 122 with the polarization compensation element 1701. In this case, like the embodiment shown in FIG. 17, the quarter-wave plate 1702 of the polarization compensation element 1701 is not mounted to the actuator but the half-wave plate 1702 is mounted. Thereby, lowering of characteristic of the actuator can be suppressed.

The present invention enables realizes stable detection of a reproduction signal of a high-speed optical disk of the large capacity and multilayer type with higher signal quality and can provide application thereof into a wide range of industrial field such as a large capacity video recorder, a hard disk data backup device, and a stored information archives device or the like.

What is claimed is:

1. An optical head for radiating a light to an optical recording medium in order to detect a reflected light from the optical recording medium, comprising:
    a light source;
    a first dividing unit for dividing the light emitted from the light source into a first light flux and a second light flux;
    a light collecting unit for collecting the first light flux onto the optical recording medium, the first light flux being reflected from the optical recording medium as a signal light;
    a reflector for reflecting the second light flux as a reference light including a polarization compensation element being provided within a path of the second light flux which is reflected as the reference light;
    a second dividing unit for dividing interfering light of the signal light reflected from the optical recording medium and the reference light into a plurality of light fluxes, such that phase differences of the signal light and the reference light in said plurality of light fluxes are different from each other; and
    a plurality of detectors formed on a same substrate for detecting lights divided with the second dividing unit.

2. The optical head according to claim 1, wherein the second dividing unit divides light obtained from the signal light reflected from the optical recording medium and the reference light through multiplexing and interference and provides the phase differences between the signal light and the reference light included in the respective divided lights.

3. The optical head according to claim 1, wherein the second dividing unit comprises a non-polarizing optical element, a selective polarization conversion element, and a polarization splitting element.

4. The optical head according to claim 3, wherein the selective polarization conversion element converts the signal light and the reference light into circular polarization in inversed rotating directions so that both the signal light the reference light have P-polarization and S-polarization equally in first order lights diffracted at a predetermined diffraction angle.

5. The optical head according to claim 3, wherein the selective polarization conversion element and the polarization splitting element are integrally laminated.

6. The optical head according to claim 3, wherein the selective polarization conversion element is constituted with an anisotropic optical material having an optical axis in the axis direction of an incident light and is arranged so that light to be converted to circular polarization is incident on the selected polarization conversion element with a tilted direction.

7. The optical head according to claim 6, wherein a thickness of the anisotropic optical material is adjusted to convert the tilted incident light to the circular polarization.

8. The optical head according to claim 1, wherein the second dividing unit comprises polarizing gratings that are orthogonally crossing in the optical axes, and a polarization splitting element.

9. The optical head according to claim 8, wherein the light passing through the polarizing gratings is a linear polarization light and the diffracted light is converted to circular polarization.

10. The optical head according to claim 8, wherein the polarizing gratings and the polarization splitting element are integrally laminated.

11. The optical head according to claim 8, wherein the polarizing gratings are mutually overlapped with a phase deviation of grating of 90°.

12. The optical head according to claim 1, wherein the reflector includes a corner cube prism mounted on an actuator movable in an optical axis direction, and an optical axis is adjusted at the vertex of a cube of the corner cube prism.

13. The optical head according to claim 12, wherein the polarization compensation element enables compensation of polarization and phase change of the corner cube prism.

14. The optical head according to claim 13, wherein a quarter-wave plate and a half-wave plate inserted in the second light flux compensate change of polarization of the corner cube prism, and the half-wave plate is mounted to the actuator in integration with the corner cube prism.

15. The optical head according to claim 12, wherein the corner cube prism is mounted to the actuator for relatively moving thereof to the first dividing unit in integration with the light collecting unit.

16. The optical head according to claim 1, wherein the reflector is arranged to reflect the second light flux so that the reflected light which is reflected via the polarization compensation element as the reference light and the signal light reflected from the optical recording medium are superimposed and are orthogonally crossing in a polarization direction.

17. An optical disk device mounting an optical head for radiating a light to an optical recording medium to detect a reflected light from the optical recording medium, the optical head comprising:
    a light source;
    a first dividing unit for dividing light emitted from the light source to a first light flux and a second light flux;
    a light collecting unit for collecting the first light flux onto the optical recording medium, the first light flux being reflected from the optical recording medium as a signal light;
    a reflector for reflecting the second light flux as a reference light without collection to the optical recording medium including a polarization compensation element being provided within a path of the second light flux which is reflected as the reference light; and
    a second dividing unit for dividing interfering light of the signal light reflected from the optical recording medium and the reference light into a plurality of light fluxes, such that phase differences of the signal light and the reference light in said plurality of light fluxes are different from each other, and
    wherein the optical disk device further comprises:
    a unit for detecting a defocus of the signal light radiated to the optical recording medium;

the light collecting unit collecting and radiating the first light flux onto the optical recording medium in accordance with a focus error signal;

a unit for compensating the defocus by controlling the light collecting unit;

a unit for moving the reflector in an optical axis direction; and a unit for adjusting the reflector in accordance with the focus error signal so that an optical path length difference between the signal light and the reference light is within coherence length of the light source.

18. The optical disk device according to claim 17, wherein the reflector is a corner cube prism where an optical axis is adjusted at the vertex of a cube.

19. The optical disk device according to claim 18, wherein a quarter-wave plate and a half-wave plate are inserted in the second light flux to compensate for the change of polarization of the corner cube prism, and wherein the half-wave plate is mounted to an actuator in integration with the corner cube prism.

20. An optical head comprising:
a light source;
a splitting prism arranged to divide light emitted from the light source into a signal light and a reference light;
a light focusing unit to focus the signal light on an optical recording medium;
a reflector arranged to reflect the reference light as the reference light including a polarization compensation element being provided in a path of the reference light;
a polarization phase conversion splitting element disposed to divide interfering light of the signal light reflected from the optical recording medium and the reference light into a plurality of light fluxes, such that phase differences in the interference between the signal light and the reference light in said plurality of light fluxes are different from each other; and
a plurality of detectors formed on a same substrate, to detect split lights divided by the polarization phase conversion splitting element,
wherein the polarization phase conversion splitting element is comprised of a non-polarizing optical element, a selective polarization conversion element, and a polarization splitting element.

* * * * *